United States Patent Office 2,776,953
Patented Jan. 8, 1957

2,776,953
POLYMERIZATION PROCESS

Milton A. Taves, Wilmington, Del., assignor to Hercules Powder Company, Wilmington, Del., a corporation of Delaware No Drawing. Application September 15, 1953,
Serial No. 380,344

19 Claims. (Cl. 260—82.5)

This invention relates to an improved process for the polymerization of unsaturated compounds and more particularly to a process for the emulsion polymerization of vinyl, vinylidene, and vinylene compounds at temperatures below 10° C.

The emulsion polymerization of vinyl compounds has customarily been effected at relatively high temperatures. For example, a temperature of about 122° F. has been accepted as a standard for the commercial production of the butadiene-styrene copolymer-type synthetic rubbers. These prior art emulsion polymerization processes are, however, not as advantageous in some respects as are polymerizations carried out at lower temperatures. It is known, for example, that the synthetic rubberlike materials produced by emulsion polymerization at temperatures substantially below 122° F. are markedly superior in important physical characteristics such as tensile strength, elongation, flex life, resilience and resistance to accelerated aging to similar materials prepared within the conventional temperature ranges.

One of the problems which has heretofore hampered the commercial production of synthetic rubberlike materials by the low temperature emulsion polymerization of vinyl compounds has been that of reducing the reaction time required to produce a desirable yield of polymeric materials. While in some instances these difficulties were overcome at least partially by the utilization of a more active initiating agent, it was usually found necessary in each case to resort also to more expensive emulsifying agents, thus making the process unattractive economically. Consequently, one of the major problems of the art has been to find a process for the low temperature emulsion polymerization of vinyl compounds which would result in a good quality product after a reasonable reaction time and which would allow the use of ingredients cheap enough to render the process economically feasible.

Now in accordance with this invention, it has been discovered that the polymerization of organic compounds containing the $CH_2=C<$ group may be effected at temperatures below about 10° C. in aqueous emulsion in the presence of an emulsifying agent, a material capable of forming an electromotive couple having a standard oxidation-reduction potential between about −1.0 and about −0.3 volt as activating agent, and a polycyclohexyl hydroperoxide of not more than 3 carbon rings and in which the hydroperoxy group is attached to a tertiary carbon atom in one of the carbon rings.

The standard oxidation-reduction potential to which reference is made herein is the value in volts of the electrical potential of the couple in question determined at 25° C. under a pressure of one atmosphere with solutions of one molal activity referred to the potential of the hydrogen-hydrogen ion couple as zero. The sign of the oxidation-reduction potential value is negative when the reduced form of the couple is a weaker reducing agent than hydrogen.

One of the components of the activating agents used in this invention may be a metallic reducing agent, and the term "metallic reducing agent" is utilized herein to designate all of those materials which contain metallic atoms and which are capable of acting as reducing agents, i. e., which are capable of donating an electron to other components of the reaction mixture. Thus, there is embraced by the term "metallic reducing agent" not only the free metallic ions such as the ferrous ion $(Fe++)$ but also complexes of such metallic ions such as the ferrous pyrophosphate complex. Likewise included are metallic compounds which are substantially completely insoluble but which nevertheless act as reducing agents such as, for example, nickel hydroxide $(Ni(OH)_2)$ which forms the couple $Ni(OH)_2+2OH^-\rightarrow NiO_2+2H_2O+2e^-$ the standard oxidation-reduction potential of which is −0.5 volt.

The catalysts of this invention are polycyclohexyl hydroperoxides, for example, bicyclohexyl hydroperoxide and tricyclohexyl hydroperoxide, in which the hydroperoxy group is attached to a tertiary carbon atom in one of the cyclohexyl rings. It is preferred to use the hydroperoxides containing not more than 3 cyclohexyl rings because the hydrocarbons from which they are prepared are more easily available, but hydroperoxides of more than 3 cyclohexyl rings may also be used. One or more or all of the carbon rings may contain substituent groups. These catalysts may be represented by the structural formulas

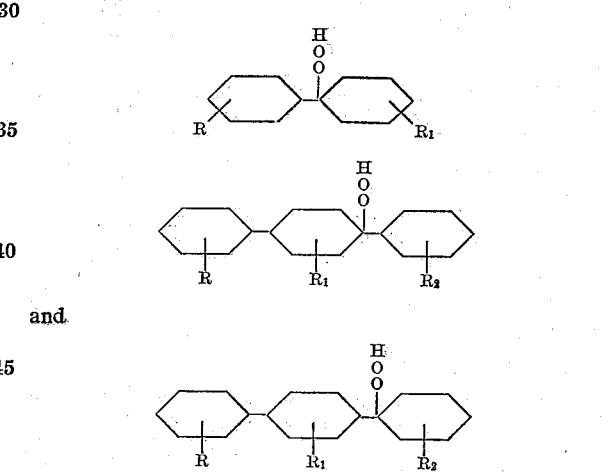

and where R and/or $R_1$ and/or $R_2$ may be H, X, XO, $X_2N$, Br or Cl, X being an alkyl radical. R, $R_1$ and $R_2$ may be the same or different. These compounds, when utilized as catalysts, permit shorter polymerization reaction times at low temperatures without sacrifice in yield than was heretofore possible.

The following examples are illustrative of the preparation of polymers by emulsion polymerization in accordance with this invention. The bicyclohexyl and tricyclohexyl hydroperoxides used in these examples were prepared by oxidation of bicyclohexane and tricyclohexane, respectively, at 115° C. with oxygen in an aqueous system containing 0.8% sodium carbonate by weight based upon the particular hydrocarbon. By this method, products containing 5–15% by weight hydroperoxide were obtained, the major impurities being the corresponding hydrocarbons which are inert in the polymerization reaction. The hydroperoxides were concentrated before use by vacuum distillation of part of the hydrocarbon. All parts in the examples relative to the hydroperoxides are on a 100% basis and all parts represent parts by weight.

Example 1

In this and the following examples, copolymers of butadiene-1,3 and styrene were prepared in glass containers. In this example the reaction mixture was formulated from the following ingredients in the proportions indicated.

| Ingredients | Parts |
| --- | --- |
| Butadiene | 71. |
| Styrene | 29. |
| Water (Total) | 180. |
| Dehydrogenated Rosin | 4.7. |
| Potassium Hydroxide | Sufficient to Neutralize Rosin. |
| Trisodium Phosphate Dodecahydrate | 0.55. |
| Bicyclohexyl Hydroperoxide | 0.130. |
| Tertiary Mercaptans [1] (Modifier) | 0.156. |
| Activator: | |
| Ferrous Sulfate Heptahydrate | 0.09. |
| Potassium Pyrophosphate | 0.20. |
| Dextrose Monohydrate | 0.842. |

[1] A tertiary mercaptan blend composed of $C_{12}$, $C_{14}$ and $C_{16}$ tertiary mercaptans in the ratio of 3:1:1.

The ferrous pyrophosphate activator was prepared under nitrogen by digesting 0.842 part dextrose monohydrate with 0.20 part potassium pyrophosphate in 7.2 parts water for 10 minutes at 90–100° C. The solution was cooled to 50° C. and 0.09 part ferrous sulfate heptahydrate dissolved in 1.6 parts water was added and the solution agitated at 50° C. for 5 minutes. The solution was then cooled rapidly to 30° C., transferred to a tightly capped vessel and stored at 0° C. under nitrogen. The activator was used within 24 hours after preparation.

The potassium salt of dehydrogenated rosin which was employed as an emulsifier was prepared by dissolving the dehydrogenated rosin, trisodium phosphate and potassium hydroxide in 168 parts distilled water and boiling for 2 minutes. The solution was cooled to room temperature and sufficient distilled water to make a total of 177 parts solution was added. The dehydrogenated rosin employed was prepared by dehydrogenating a distilled N wood rosin (about 5% light ends and 8% residue removed) in the presence of a palladium-on-carbon catalyst. The product so obtained had an acid number of 161.

After the emulsifying agent had been prepared, the mercaptan modifier and hydroperoxide were dissolved in freshly washed and dried styrene and the resultant solution charged to a glass reaction vessel along with the emulsifying agent in such a manner that the two phases did not mix. The vessel was sealed and freshly distilled butadiene was added by injection with a hypodermic needle and the vessel stored at 0° C. until the reaction was initiated. Initiation of the reaction was effected by injecting the activator solution into the reaction vessel. The reaction vessel was then shaken vigorously, pressured with 15 lb. nitrogen and tumbled end over end in a 5° C. bath. Samples of the contents of the reaction vessel were withdrawn at periodic intervals after the addition of the activator. To each sample so obtained was added a small portion of ditertiary butyl hydroquinone in a small amount of ethanol to prevent further conversion and the sample dried in a low pressure oven at 70–80° C. From the weight of the dried latex, the percent of hydrocarbon conversion was calculated. It was determined that a 60% conversion was obtained in 5.0 hours as compared to 7.1 hours for a diisopropylbenzene monohydroperoxide control and 6.2 hours for a p-menthane hydroperoxide control.

Example 2

The procedure of Example 1 was carried out except that 0.185 part tricyclohexyl hydroperoxide was substituted for the bicyclohexyl hydroperoxide of Example 1. A 60% conversion of monomers to copolymer was obtained in 5.0 hours as compared to 7.1 hours for a diisopropylbenzene monohydroperoxide and 6.2 hours for a p-menthane hydroperoxide control.

Example 3

In this example butadiene and styrene were copolymerized according to the procedure of Example 1 with the exception that in this example a ferrous sequestrene activator was utilized. This activator was prepared by dissolving 0.244 part ethylenedinitrilotetraacetic acid in an equivalent amount of aqueous potassium hydroxide solution and adding thereto a solution of 0.207 part ferrous sulfate in 2.4 parts boiled distilled water at room temperature with stirring under nitrogen. Boiled distilled water in the amount of 2.8 parts was added and the solution was stored in a polymerization vessel under 15 lb. nitrogen pressure until utilized. Bicyclohexyl hydroperoxide in the amount of 0.165 part was utilized in this example. A 60% conversion of monomers to copolymer was obtained in 0.9 hour compared to 1.8 hours for a p-menthane hydroperoxide control.

Example 4

Following the procedure of Example 3, butadiene and styrene are polymerized utilizing 0.233 part tricyclohexyl hydroperoxide in place of bicyclohexyl hydroperoxide. A 60% conversion is obtained in 0.9 hour compared to 1.8 hours for a p-menthane hydroperoxide control.

The polycyclohexyl hydroperoxide catalysts of this invention may be prepared by the oxidation of the corresponding polycyclohexyl compounds. These compounds have the structural formulas

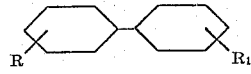

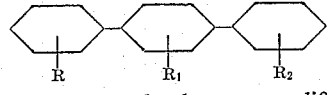

wherein R, $R_1$ or $R_2$ may be the same or different groups and may represent H, X, XO, $X_2N$, Br or Cl, where X is an alkyl radical.

The oxidation may be carried out in the liquid phase utilizing air or molecular oxygen as the oxidizing agent. A preferred method of preparing these hydroperoxides involves the oxidation of the corresponding polycyclohexyl compound having one or another of the above structural formulas by passing an oxygen-containing gas through the compound at a temperature between about 50° C. and 150° C. in the presence of an aqueous alkali such as, for example, sodium carbonate. Ultraviolet light may be used to initiate the oxidation reaction. The concentration of the alkali may be between about 0.01% and about 35%, although it is preferable to use concentrations of about 0.01% and about 2%. Vigorous agitation is desirable during the oxidation reaction.

As illustrative of the polycyclohexyl compounds, other than bicyclohexyl and tricyclohexyl which may be oxidized to hydroperoxides of this invention, alkyl-substituted bicyclohexyl and tricyclohexyl compounds may be mentioned. There may be more than one alkyl group attached to the molecule and all these alkyl groups may be attached to one or another carbon ring or they may be attached to more than one such group. Alkyl-substituted bicyclo- and tricyclo-hexyl compounds in which the alkyl group contains not more than 7 carbon atoms produce, upon oxidation, hydroperoxides which are preferred over similar hydroperoxides containing larger alkyl groups. Alkyl groups containing not more than 7 carbon atoms are referred to herein as lower alkyl groups. Alkyl substituent groups should be saturated.

Illustrative of the alkyl groups mentioned are methyl-, ethyl-, n-propyl-, n-butyl-, isobutyl-, tertiary butyl-, pentamethylethyl- and the like. As representative of the hydrocarbons which may be oxidized to hydroperoxides of this invention, bicyclohexyl, methylbicyclohexyl, ethylbicyclohexyl, n-propylbicyclohexyl and the like may be mentioned, as may be the corresponding methyl, ethyl, propyl, butyl, etc. derivatives of tricyclohexyl. Upon oxidation, these hydrocarbons lead to 1-cyclohexyl-1-hydroperoxy cyclohexane, methyl-1-cyclohexyl-1-hydroperoxy cyclohexane, ethyl-1-cyclohexyl-1-hydroperoxy cyclohexane, n-propyl-1-cyclohexyl-1-hydroperoxy cyclohexane, etc., and correspondingly with similar alkyl derivatives of tricyclohexyl. It is also possible to have more than one substituent group attached to one of the cyclohexyl rings, as in the case of 1-dimethylcyclohexyl-1-hydroperoxy cyclohexane, 1-methylethylcyclohexyl-1-hydroperoxy cyclohexane.

Likewise, in those instances where substituents of one or more cyclohexyl rings are one or another or a combination of XO, X$_2$N, Br or Cl, where X is an alkyl group, the compounds such as, for example, bromobicyclohexyl, bromotricyclohexyl may be oxidized to the corresponding hydroperoxides. Examples of compounds which contain the alkoxy group are methoxybicyclohexyl, methoxytricyclohexyl, etc. Dialkylamino-substituted polycyclohexyl compounds which are operable are illustrated by dimethylaminobicyclohexyl, methylethylaminobicyclohexyl, etc., and corresponding derivatives of tricyclohexyl.

All of the foregoing compounds and their homologs and equivalents may be oxidized to polycyclohexyl hydroperoxides of this invention. In each instance the hydroperoxide which is effective in this invention is a monohydroperoxide in which the hydroperoxy group is attached to a tertiary carbon atom in one of the cyclohexyl rings. While none of the representative compounds mentioned contain alkyl groups having more than a few carbon atoms, one skilled in the art will realize that higher homologs may also be utilized. However, bicyclohexyl- and tricyclohexyl-hydroperoxides containing lower alkyl substituent groups, that is, polycyclohexyl hydroperoxides containing not more than 3 cyclohexyl rings and having substituent groups which are saturated lower alkyl radicals of not more than 7 carbon atoms are preferred in this invention. The compounds, bicyclohexyl hydroperoxide, tricyclohexyl hydroperoxide, methylbicyclohexyl hydroperoxide, methyltricyclohexyl hydroperoxide and 1-pentamethylethylcyclohexyl-1-hydroperoxy cyclohexane are particularly preferred as producing outstanding results.

The amount of hydroperoxide which may be used in accordance with this invention may be between about 0.1% and about 20% based on the amount of solid emulsifying agent used. The preferable amount of hydroperoxide on this basis, however, is from about 0.5% to about 4%. Based on the monomers, the amount of hydroperoxide may be from about 0.001 to about 5.0%, a desirable range being from about 0.005% to about 1.0%, and the preferable amount of hydroperoxide on this basis being from about 0.01% to about 0.2%.

The process of this invention may be carried out using various emulsifying agents, such as fatty acid soaps, the water-soluble salts of hydrogenated and dehydrogenated rosins or of the pure acids thereof, such as dihydroabietic, tetrahydroabietic, and dehydroabietic acids; the water-soluble salts of the amines derived from hydrogenated and dehydrogenated rosins or from the pure acids thereof, for example, the acetates of dihydroabiethylamine, tetrahydroabiethylamine, and dehydroabiethylamine; and any other emulsifying agent well known in the art. The rosin amines mentioned may be prepared by converting the acids in the rosin material to the corresponding nitriles by treatment with ammonia under dehydrating conditions, and then reducing the nitriles to the amines by catalytic hydrogenation.

The salts of hydrogenated and dehydrogenated rosin which may be used as emulsifying agents in this invention are prepared by the neutralization of hydrogenated and dehydrogenated rosin, respectively, with an alkali metal compound basic in characteristics, such as the hydroxides and carbonates of sodium and potassium. Hydrogenated rosin acid soaps and dehydrogenated rosin acid soaps may be utilized in conjunction with fatty acid soaps as emulsifying agents in the process of this invention. Thus, emulsifying agents containing up to 50% fatty acid soaps by weight may be utilized. A preferable range of concentration of fatty acid soaps is from about 10% to about 30% of the weight of the emulsifying agent. It is preferable that the fatty acid soaps employed in this invention be prepared from long-chain fatty acids which have from about 12 to about 18 carbon atoms in the molecule. A readily available source of such a mixture of fatty acids and rosin acids is tall oil. Tall oil is a by-product from the manufacture of paper pulp by the digestion of wood with alkaline liquors such as alkaline solutions of sodium sulfide. Crude tall oil consists of a mixture of rosin and fatty acids in roughly equal proportions in conjunction with minor amounts of neutral, unsaponifiable materials consisting primarily of plant sterols. For utilization in the preparation of the emulsifying agents of this invention it is desirable that the tall oil be refined to remove certain polymerization inhibiting materials by treatment with a spent hydrogenation catalyst and then hydrogenated or dehydrogenated.

The emulsifying agents hereinbefore described may be employed in an amount equivalent to from about 0.2% to about 5% based on the total emulsion polymerization reaction mixture. A preferred range on this basis is from about 0.5% to about 2% of the weight of the reaction mixture. The concentration of the emulsifying agent in the aqueous phase may be from about 0.5% to about 5%, preferably from about 1% to about 3%. Based on the weight of the monomers originally present, the emulsifying agent may be utilized in an amount equivalent to from about 0.5% to about 15% of the weight thereof and preferably in an amount equivalent to from about 2% to about 6% of the weight thereof.

The activators which are operable in the process of this invention comprise those electromotive couples having a standard oxidation-reduction potential between about −1.0 and about −0.3 volt, preferably between about −0.8 to about −0.5 volt. Such activators should be capable of reducing a phenylcyclohexyl hydroperoxide such as, for example, phenylcyclohexyl hydroperoxide itself to a ketone in better than about 25% yield in from about 0.25 hour to about 50 hours. Preferable are those electromotive couples containing a metallic reducing agent, such as the ferrous (Fe++) ion, which forms a couple in the reaction mixture with an analogous material of higher oxidation state, such as the ferric (Fe+++) ion.

In so far as the preparation of ferrous pyrophosphate activators is concerned, the pyrophosphate compound and the ferrous salt utilized should be employed in such proportions that there is present in the reaction mixture in which the activator is formed from about 0.3 to about 2.5 chemical equivalents of the pyrophosphate for each chemical equivalent of the ferrous salt. A preferable range is from about 0.8 to about 2.0 chemical equivalents of pyrophosphate per chemical equivalent of ferrous salt. Particularly desirable is the presence of about 1.4 chemical equivalents of pyrophosphate for each chemical equivalent of ferrous salt. Soluble ferrous salts other than ferrous sulfate, such as, for example, ferrous chloride either alone or in combination with other reducing agents such as reducing sugars may, of course, be utilized in the preparation of the ferrous activators which are operable in the process of this invention. Likewise, similar salts of analogous metals may be employed. It is desirable, of course, that the metallic ion component of these salts be in a reduced oxidation state. Furthermore, the ferrous and analogous metallic ions derived from these salts may be complexed with anions other than the pyrophosphate ion to form operable activators. For example, gluconate and citrate ions may be so utilized. The ferrous complex of ethylenedinitrilotetraacetic acid, ferrous-o-phenanthraline and polyamines such as diethylenetriamine, triethylenetetramine and tetraethylenepentamine also are operable.

The reducing agents operable in this invention, it will be observed, are essentially characterized by their ability to form an electromotive couple having a standard oxidation-reduction potential of between —1.0 and —0.3 volt and it is this electrochemical manifestation of these compounds which is the critical factor in distinguishing the reducing agents of this invention from other reducing agents.

The activator may be used in such an amount that there is provided from about 0.1 to about 3.0 electrons for each hydroperoxy radical. A preferable range for freshly prepared activators is from about 0.8 to about 1.2 electrons per hydroperoxy radical, and that for activators aged at room temperature or by heating for a short time at elevated temperatures is from about 0.8 to about 2.0 electrons per hydroperoxy radical.

Aqueous solutions of water-soluble organic compounds of low freezing point may be employed as antifreeze media when the process of this invention is carried out at sub-zero temperatures. Thus, water solutions of the lower alkanols, such as methanol and ethanol, may be utilized. Also operable are water solutions of other alcohols, including polyfunctional alcohols such as glycerol or ethylene glycol. In fact, at quite low temperatures, better reaction rates are often obtained by the utilization as antifreeze agents of such polyfunctional molecules. If desired, water solutions of nonalcoholic compounds such as acetone and methyl acetate may be employed. In any particular instance, those skilled in the art will be able to select or formulate a reaction medium, the freezing point of which is below the temperature at which it is desired to effect a particular polymerization reaction. Such reactions may be readily carried out at temperatures of —15° C. in a medium consisting of 3 parts of water and 1 part methanol. As previously indicated, it is advantageous prior to admixing the emulsifying agent with the other ingredients of the polymerization system to form a solution or suspension thereof in a portion of the antifreeze medium.

α-Hydroxy carbonyl compounds or compounds which react as α-hydroxy carbonyl compounds may be added to the other ingredients of the reaction mixture in the process of this invention. Thus, such compounds as fructose, glucose, lactose, sorbose, acetylacetone, ascorbic acid, benzoin, acetoin, propionoin, butyroin, isobutyroin, pivaloin and the like may be utilized. In general, those aldehydes and ketones containing a hydroxyl group on an adjacent carbon atom in an alkyl chain and having thereby in common the structural group

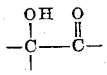

are operable in this invention. The preferable α-hydroxy aldehydes and ketones are those compounds which are known as reducing sugars. As illustrative of the α-hydroxycarbonyl compounds in general, the amount of reducing sugar employed may vary from about 0.01 to about 6% of the weight of the monomers. A preferable range on this basis is from about 0.1 to about 3%. Particularly appropriate is that quantity of sugar equivalent to about 0.5% of the weight of the monomer.

It is desirable, particularly in the polymerization of those compounds leading to synthetic rubberlike materials, that there be included in the polymerization reaction mixture a modifying agent. The conventional modifying agents may be used in the process of this invention. Thus, the mercaptans normally so employed may be utilized, and the amount may be that usually used, for example, in the preparation of synthetic rubbers. It is desirable, however, that the mercaptan modifier be tertiary for the reason that improved modification of the rubber is thereby obtained. Primary mercaptans may, however, be employed if desired.

The emulsion polymerization of the vinyl, vinylene and vinylidene compounds may be effected in accordance with this invention at temperatures up to about 10° C. Temperatures as low as —70° C. may be employed if desired. The preferable temperature range is from about —30° C. to about 10° C.

If desired, small quantities of inorganic salts such as potassium sulfate may be added to the reaction mixture to reduce the viscosity of the latices of the polymers obtained. The utilization of large quantities of such salts, however, adversely affects the range and extent of polymerization. A preferable range of concentration of such salts is from about 0.1 to about 0.5% of the weight of the monomers. Except as otherwise indicated, the conventional emulsion polymerization techniques, concentrations of reactants and reaction conditions may be utilized in practicing the process of this invention.

Any vinyl compound which may be advantageously polymerized by peroxide initiation in an emulsion polymerization process is operable according to the process of this invention. Illustrative of these compounds are the conjugated butadienes such as butadiene-1,3, isoprene, 2,3-dimethyl butadiene-1,3, chloroprene, piperylene, monomer mixtures of two or more of these conjugated butadienes such as a mixture of butadiene-1,3 and 2,3-dimethyl butadiene-1,3 and monomer mixtures of one or more of these conjugated butadienes with vinyl compounds such as styrene, p-chlorostyrene, p-methoxystyrene, vinyl naphthalene, acrylic acid, methacrylonitrile, methyl methacrylate, methyl acrylate, methyl vinyl ketone, methyl isopropenyl ketone, methyl vinyl ether and the like. The process of this invention is particularly applicable to the preparation of the copolymers of butadiene and styrene or acrylonitrile, isoprene and styrene or acrylonitrile, and other rubberlike copolymers as well as in the preparation of polymers such as polyvinyl chloride, polyvinyl acetate, polystyrene, polymethylmethacrylate, polyvinylidene chloride, polyvinyl pyridine, and the various other addition polymers which may be prepared by the emulsion technique.

What I claim and desire to protect by Letters Patent is:

1. The process which comprises polymerizing an organic compound containing the CH₂=C< group at a temperature below about 10° C. in aqueous emulsion in the presence of an emulsifying agent, an electromotive couple having a standard oxidation-reduction potential between about —1.0 and about —0.3 volt as activator and as catalyst a polycyclohexyl hydroperoxide in which the hydroperoxy group is attached to a tertiary carbon atom in a cyclohexyl ring.

2. The process of claim 1 in which the activator is an electromotive couple having a standard oxidation-reduction potential between about —0.8 and —0.5 volt.

3. The process of claim 1 in which the emulsifying agent is potassium dehydroabietate.

4. The process of claim 1 in which butadiene-1,3 and styrene are copolymerized.

5. The process of claim 1 in which the emulsifying agent is potassium tetrahydroabietate.

6. The process of claim 5 in which the hydroperoxide is tricyclohexyl hydroperoxide, the monomers polymerized are butadiene-1,3 and styrene and the activator is an electromotive couple having a standard oxidation-reduction potential between about —0.8 and —0.5 volt.

7. The process of claim 1 in which butadiene-1,3 is polymerized.

8. The process of claim 7 wherein the hydroperoxide is 1-cyclohexyl-1-hydroperoxy cyclohexane, the emulsifying agent is potassium dehydroabietate and the activator is an electromotive couple having a standard oxidation-reduction potential between about —0.8 and —0.5 volt.

9. The process of claim 1 wherein butadiene-1,3 and acrylonitrile are polymerized.

10. The process of claim 9 wherein the hydroperoxide is tricyclohexyl hydroperoxide, the emulsifying agent is potassium dehydroabietate and the activator is an electromotive couple having a standard oxidation-reduction potential between about —0.8 and —0.5 volt.

11. The process which comprises polymerizing an organic compound containing the $CH_2=C<$ group at a temperature below about 10° C. in aqueous emulsion in the presence of an emulsifying agent, an electromotive couple having a standard oxidation-reduction potential between about —1.0 and about —0.3 volt as activator and as catalyst a hydroperoxide selected from the group consisting of polycyclohexyl hydroperoxides of the structural formulas:

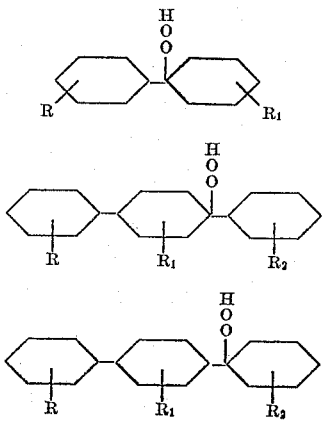

where $R$, $R_1$ and $R_2$ are of the group consisting of H, X, XO, $X_2N$, Cl and Br and X is a saturated lower alkyl group.

12. The process of claim 11 in which the hydroperoxide is 1-cyclohexyl-1-hydroperoxy cyclohexane.

13. The process of claim 12 in which the emulsifying agent is potassium dehydroabietate.

14. The process of claim 13 in which the butadiene-1,3 and styrene are polymerized and the activator is an electromotive couple having a standard oxidation-reduction potential between about —0.8 and —0.5 volt.

15. The process of claim 14 in which the activator is a $Fe^{++}$, $Fe^{+++}$ electromotive couple.

16. The process of claim 11 in which the hydroperoxide is tricyclohexyl hydroperoxide.

17. The process of claim 16 in which the emulsifying agent is potassium dehydroabietate.

18. The process of claim 17 in which butadiene-1,3 and styrene are polymerized and the activator is an electromotive couple having a standard oxidation-reduction potential between about —0.8 and —0.5 volt.

19. The process of claim 18 wherein the activator is a $Fe^{++}$, $Fe^{+++}$ electromotive couple.

References Cited in the file of this patent

UNITED STATES PATENTS

| | | |
|---|---|---|
| 2,606,893 | Reynolds et al. | Aug. 12, 1952 |
| 2,609,362 | Fryling et al. | Sept. 2, 1952 |